(12) United States Patent
Safwat

(10) Patent No.: US 6,347,908 B1
(45) Date of Patent: Feb. 19, 2002

(54) FISH GUIDANCE SYSTEM

(76) Inventor: Sherif Safwat, 1925 Donner Ave., Davis, CA (US) 95616

( * ) Notice: Subject to any disclaimer, the term of this patent is extended or adjusted under 35 U.S.C. 154(b) by 0 days.

(21) Appl. No.: 09/466,163

(22) Filed: Dec. 18, 1999

Related U.S. Application Data

(60) Provisional application No. 60/113,147, filed on Dec. 19, 1998.

(51) Int. Cl.$^7$ .................................................. E02B 8/08
(52) U.S. Cl. .............................. 405/81; 405/82; 405/83; 119/219
(58) Field of Search .............................. 405/81, 82, 83, 405/80; 119/219

(56) References Cited

U.S. PATENT DOCUMENTS

| | | | | | |
|---|---|---|---|---|---|
| 2,612,861 A | * | 10/1952 | Burkey | ........................ | 119/219 |
| 2,751,881 A | * | 6/1956 | Burkey | ........................ | 119/219 |
| 2,761,421 A | * | 9/1956 | Burkey | ........................ | 119/219 |
| 4,260,286 A | * | 4/1981 | Buchanan | ...................... | 405/82 |
| 4,740,105 A | * | 4/1988 | Wollander | ...................... | 405/83 |
| 5,632,572 A | * | 5/1997 | Chicha | ........................... | 405/81 |

* cited by examiner

Primary Examiner—David Bagnell
Assistant Examiner—Frederick L. Lagman
(74) Attorney, Agent, or Firm—D. E. Schreiber, Esq.

(57) ABSTRACT

A series of disturbed (or rippled) air-water interface regions contiguously arranged guide anadromous fish in a selected direction. Artificial or natural light, diffusely refracted by passage through the disturbed regions, establishes an aura-dominated passage that elicits a learned response from fish which have a "silver underbody" perceive the passage being safe. Accordingly, a fish guidance system in accordance with the present invention may include shower assemblies or nozzles for spraying a fluid, such as water, onto the surface of a body of water, and light assemblies for illuminating disturbed air-water interface regions created by the sprayed fluid. A dark, light absorbing surface beneath the aura-dominated passage enhances its effectiveness as do darkened regions created alongside of and complementing that passage. The darkened regions may also be advantageously exploited for guiding dark, catadromous fish.

63 Claims, 16 Drawing Sheets

FISH GUIDANCE SYSTEM

CLAIM OF PROVISIONAL APPLICATION RIGHTS

This application claims the benefit of United States Provisional Patent Application No. 60/113,147 filed on Dec. 19, 1998.

BACKGROUND OF THE INVENTION

1. Field of the Invention

The present invention relates to bypass guidance systems for conducting anadromous fish (e.g. salmon, American shad, blueback herring) as well as catadromous fish (e.g. eels) through dams and other man-made obstructions with maximum throughput and minimum stress to the migrating fish, as well as other migratory "silver underbodied" fishes, such as smelt, including Delta Smelt found in California's watercourses.

2. Description of the Prior Art

Through the world, land use associated with the development of dams and man-made lakes has adversely effected migrations of anadromous and catadromous fish. Where possible, for example at dams and their associated manmade lakes, bypass facilities have been built on the surface, overhead and submerged to facilitate migration particularly for anadromous fish, both for juveniles in the downstream direction and for adults in the upstream direction.

However, since there usually exist many such dams and lakes separating the ocean from spawning and rearing habitat, the time table of natural migration can be unduly prolonged by the presence of these obstacles. The bypass facilities constructed both at low-head and high-head dams to mitigate their adverse effect on migrating fish include but are not limited to the following: trapping and hauling, bypass or fishways, ladders or locks and fish elevators. More often than not, these bypass facilities inadvertently frighten fish, preventing the fish, particularly juveniles, from approaching the bypass facility in large numbers, and thus lead to little or no benefit despite the large costs involved. As a result, not only are many of the existing bypass facilities ineffective, but in addition most are also time consuming thereby unduly prolonging fish migration. Moreover, migrating juveniles and adults often fall easy prey to overhead and/or submerged predators at the termini of bypass facilities due to the means or methods employed. That is to say, no single fish bypass facility has yet been demonstrated to be biologically effective, practical to install and operate, and acceptable to environmental groups, or State or Federal agencies under the variety of site conditions outlined above.

BRIEF SUMMARY OF THE INVENTION

It is an object of the present invention to provide an effective method and system for guiding anadromous fish (e.g., salmon, steelhead, American shad, blueback herring) as well as catadromous fish (e.g. eels and as well Delta Smelt and similar fish) past dams, cooling and irrigation intakes, and other man-made obstructions.

Another object of the present invention is to guide such fish using their previously unrecognized natural responses to environmental stimuli.

One aspect of the invention enhances passage through dams and other man-made obstructions by artificially recreating at the water surface conditions associated with safe and/or hazardous aspects of the aquatic environment to entice migrating fish along a pre-selected and desired path.

Another aspect of the present invention is that it is capable of operating synergistically with presently existing systems for aiding fish migration, including but not limited to angled barracks positioned at entry basins, fixed screens of various shapes and orientations, velocity limiters, sluiceways, spillways, traveling screens, barrier nets and other facilities presently known to those skilled in the art, which are employed to reduce entrainment of the migrating fish in hydraulic turbines. The present invention can be advantageously combined with such conventional bypass facilities. For example, an existing fish ladder or bypass which may be combined with the present invention to safely transport the fish downstream. Trash sluiceways may also serve to transport screened fish downstream if associated with a bypass guidance system in accordance with the present invention.

Artificial environments that mimic naturally occurring conditions are surprisingly useful in eliciting a response that guides fish along a selected three-dimensional (3D) path around an obstacle in a relatively swift and low cost practical manner. It has been established that the selection criteria used by fish in choosing a path is based, inter alia, on a learned response that occurs usually during schooling in the fishes' natural (not artificial) habitat.

ANADROMOUS FISH

The present invention guides anadromous fish with a series of disturbed (or rippled) air-water interface regions contiguously arranged in a selected first direction across the air-water interface at a bypass entry basin adjacent to an obstruction such as a dam or lake. The ripples are preferably directed along the desired guidance path. The last disturbed interface region preferably has a narrowed exit that leads to the bypass facility. At each of these disturbed interface regions, artificial or natural light, diffusely refracted as it passes through the disturbed surface of the water, elicits a learned response from fish by establishing an aura-dominated passage which "silver underbodied" fish generally perceive as being safe because diffuse refracting light obscures their presence from any predator that may be present below or above the disturbed interface region. At the outlet of the bypass facility, another series of disturbed (or rippled) air-water interface regions is again established along a second direction at the exit basin together with artificial or natural light refracting from the disturbed surface of the water to again elicit the learned response described above. However, the size of the entry to the bypass guidance system at the outlet from the bypass facility reverses from that previously described at the entry thereto. That is, the entry to the bypass guidance system at the outlet from the bypass facility is narrow while the exit is large.

In one embodiment, the present invention includes a series of shower assemblies arranged in the selected first direction for the purpose of spraying fluid in a pre-selected pattern to creates the above-mentioned series of disturbed air-water interface regions. This creates a 3D path which "silver underbodied" fish usually perceive as being safe because they are hidden from view by diffuse refraction of light at the disturbed air-water interface regions. Thus nearly all "silver underbodied" fishes can be guided by systems in accordance with the present invention. The shower assemblies can be provided in various different arrangements and in associations with various artificial and natural elements as described in greater detail below.

LINEAR

For example, if the entry and exit basins at an obstruction such as a dam or lake is narrow, an overhead cable can be stretched across the basin in a selected direction starting at a bank adjacent to the bypass facility and ending at an opposite bank. This cable carries a series of lamp and shower assemblies cantilevered from the cable at selected locations. In operation, the lamp and shower assemblies create the above-mentioned series of disturbed air-water interface regions across the entry basin leading to the bypass facility. The area of the spray and illuminated regions can vary, preferably with them being largest at the entryway and smaller at the exit end or vice versa depending upon whether the bypass guidance system is located at the bypass facility's entry or exit basin, respectively. The combined disturbed interface regions can be arranged to establish a tapering or triangularly-shaped outline for the contiguous disturbed regions when they are viewed from above. In the entry basin, the triangularly-shaped outline has an apex near the entrance to the bypass facility. In the exit basin, the triangularly-shaped outline of the bypass guidance system reverses with its entrance being at the apex of a triangularly-shaped outline near the outlet from the bypass facility. Preferably the fluid applied to disturb the air-water interface regions is water, but could be compressed air.

In another embodiment, a series of buoys are anchored to the bottom of the basin in the selected direction. Each buoy includes an L-shaped tubular support having a far leg which extends above the air-water interface. A near leg of the tubular support extends from a base that is open to water intrusion and contains a pump that is energized by a power source located outside the basin. The far leg of the L-shaped support includes lamp and shower assemblies, the latter being operationally connected to the pump through the near leg to receive water, the preferred fluid for creating the disturbed air-water interface regions.

In yet another embodiment, the bypass guidance system includes a series of floating rafts moored along the selected direction, that preferably have four pontoons arranged to form a quadrilateral. Each raft includes a floor and an L-shaped support having a first leg that is attached to and extends through the floor of the raft into the water. A pump is attached to the L-shaped support to supply water to a shower assembly positioned in the second leg of the support that cantilevers from the raft. A lamp assembly is also attached at the tip of the second leg.

In still another embodiment, the rafts have blackened-undersides and also include supports which allow placing a secondary lamp sub-assembly below the air-water interface. It appears that light directed upwardly toward a blackened-underside creates a hostile environment for migrating "silver underbodied" fish thereby directing the fish along the correct aura-dominant path established by the disturbed regions and lamps. That is to say, to keep the migrating fish on the correct path and to deter them from circling back in a vertical plane through the series of rafts thereby prolonging their migration, the secondary lamp sub-assemblies are cantilevered from the back side of the raft away from the direction of fish migration to create the aforementioned hostile environment.

MULTIPLE GRID

Still another embodiment employs a grid of shower and lamp assemblies, split into separate rows, positioned along a series of parallel cables spanning the basin. Arranging progressively longer rows of shower and lamp assemblies further away from the entry to or exit from the bypass facility establishes the previously described triangularly-shaped outline for the bypass guidance system. In the entry basin, the triangularly-shaped outline includes a base row comprising shower and lamp assemblies followed by one or more additional rows of shower and lamp assemblies that are progressively closer to the entry to the bypass facility. Each successive row of shower and lamp assemblies is shorter that the preceding one. Note that as before the triangularly-shaped outline has an apex near the exit for the fish. In the exit basin when viewed from above the triangularly-shaped outline has its apex located the outlet from the bypass facility.

In the above embodiment, a canopy having a triangularly shaped aperture which complements the triangularly-shaped outline of the aura-dominated region created by the bypass guidance system can be stretched across the grid of cables. Such a canopy shades the water from above except in the aura-dominated, safe environment for "silver underbodied" fishes thereby enhancing that area's attractiveness. Concurrently, the dark area around the aura-dominated region concurrently establishes a safe environment for dark colored eels which facilitates their migration.

Still another embodiment of the present invention separates the lamp and shower assemblies by placing one or other type of assembly along a bank of the basin and the other type of assembly on rafts adjacent to the bank to establish a bypass guidance path between the rafts and bank.

Still another embodiment of the present invention, instead of using a plurality of the series of diagonal cables, uses a series of rafts arranged along separate but parallel paths to form diagonal columns of a grid of shower and lamp assemblies. Each raft carries cantilevered supports to which the shower and lamp assemblies attach. The cantilevered supports each have a first section that extends from one side of the rafts above the water facing the migrating fish. In this embodiment, a series of previously mentioned secondary lamp sub-assemblies direct light in a upwardly directed pattern that creates the aforementioned hostile environment for the anadromous migrating fish. That is to say, to keep the migrating anadromous fish on the correct path and to deter them from circling back along a vertical plane through the rafts, the secondary lamp sub-assemblies are cantilevered from the back side of the raft away from the direction of fish migration to create the aforementioned hostile environment. The last diagonal raft of the grid is located adjacent to the bypass facility. In the exit basin a plan view of the rafts' arrangement reverses.

Submerged lights that illuminate the underbody of anadromous fish repel them from an area or obstacle, such as a pump or turbine intake, and may be placed in a wide area to establish a boundary of which the fish will not cross. Mercury lamps are useful for this purpose, or lamps generating sufficient radiation to prevent aquatic growth on their surface.

CATADROMOUS FISH

For catadromous fish, the present invention elicits the desired response by artificially creating a series of disturbed shadowed or dark air-water interface regions contiguously arranged in a selected direction or directions across a bypass facility's entry basin adjacent to the obstruction to be traversed. The bypass guidance system includes a narrowed exit at the last disturbed interface region that leads to a holding tank. The holding tank is located opposite the bypass facility around the obstruction used by the anadromous fish. In the air above the boundaries of the disturbed regions, canopies can be stretched as described above to create the darkened shadowed interface regions at the air-water interface. Alternatively, a series of rafts can be deployed at the air-water interface to produce the same result. It appears that the darkened interface regions stimulate catadromous and dark colored, or dark colored, fish to elicit a learned response that the shadowed-dominated passage is a safe since it hides their presence from predators. At the exit of the holding tank, the series of disturbed shadowed interface regions is again created along a second direction, to again elicit the previously described response. However, the size of the entryway and exit at the exit from the holding tank is reversed over that previously mentioned. That is, the entryway is narrow and the exit is large. As a result, the passage of catadromous fish becomes surprising rapid.

In many cases, the exit of the holding tank is directly connected to the opposite basin so that the catadromous fish are easily transported. Or the exit of the holding tank could be blocked and catadromous fish trapped. In this way catadromous fish can be hauled around the obstruction, or the trapped catadromous fish could be disposed of commercially or in appropriate manner if such fish are determined to be deleterious to the existence of the anadromous fish in concomitant migration therewith.

An advantage of the present invention is that it advantageousy reduces head loss at power-generating dams during intervals of downstream migration. During such intervals, power generating dams using conventional fish bypass facilities may have to divert significant quantities of water from power generation into the bypass facility to ensure safe passage of migrating fish. Guiding fish more effectively into the bypass facility using a much smaller quantity of water increases the productivity of power generating dams.

These and other features, objects and advantages will be understood or apparent to those of ordinary skill in the art from the following detailed description of the preferred embodiment as illustrated in the various drawing figures.

DETAILED DESCRIPTION

Before describing various alternative embodiments of the invention in detail, a brief description of their underlying principle is appropriate. It has been discovered that an artificial environment which mimics the safety provided by natural refuge is surprisingly advantageous for guiding fish along a selected 3D path. The response elicited by an appropriate artificial environment permits relatively speedily and in a low cost and practical manner guiding fish to a specified location. Concomitantly, it has been determined that the selection criteria used by fish in selecting a path is based on a learned response that occurs usually during schooling, in fishes' natural (not artificial) habitat.

To guide fish under a plethora of environmental conditions, it has also been observed that the 3D path which fish perceive as being safe is advantageously bordered by a region perceived to be hazardous thereby further encouraging the fish to remain within the safe path. Associating a safe path with a hazardous region induces the fish to remain in the safe path within which the fish perceives that it should be unobservable to predators, whether present within the water and/or above the air-water interface.

ANADROMOUS FISH

Figure 1:
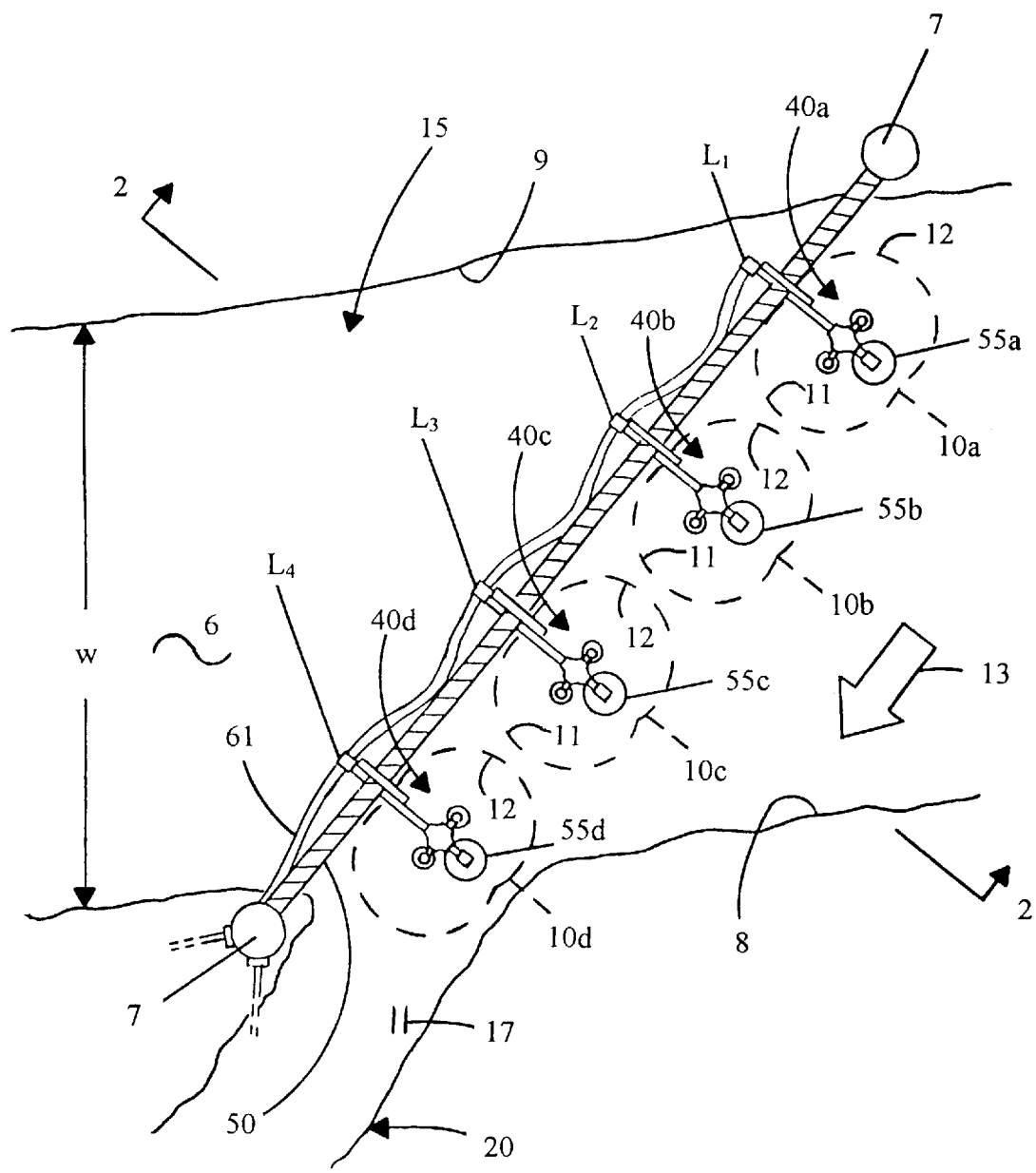
FIG. 1 is a plan view illustrating an embodiment of a bypass guidance system for anadromous fish in accordance with the present invention that deploys a series of shower and lamp assemblies at an entry basin.
Figure 2:
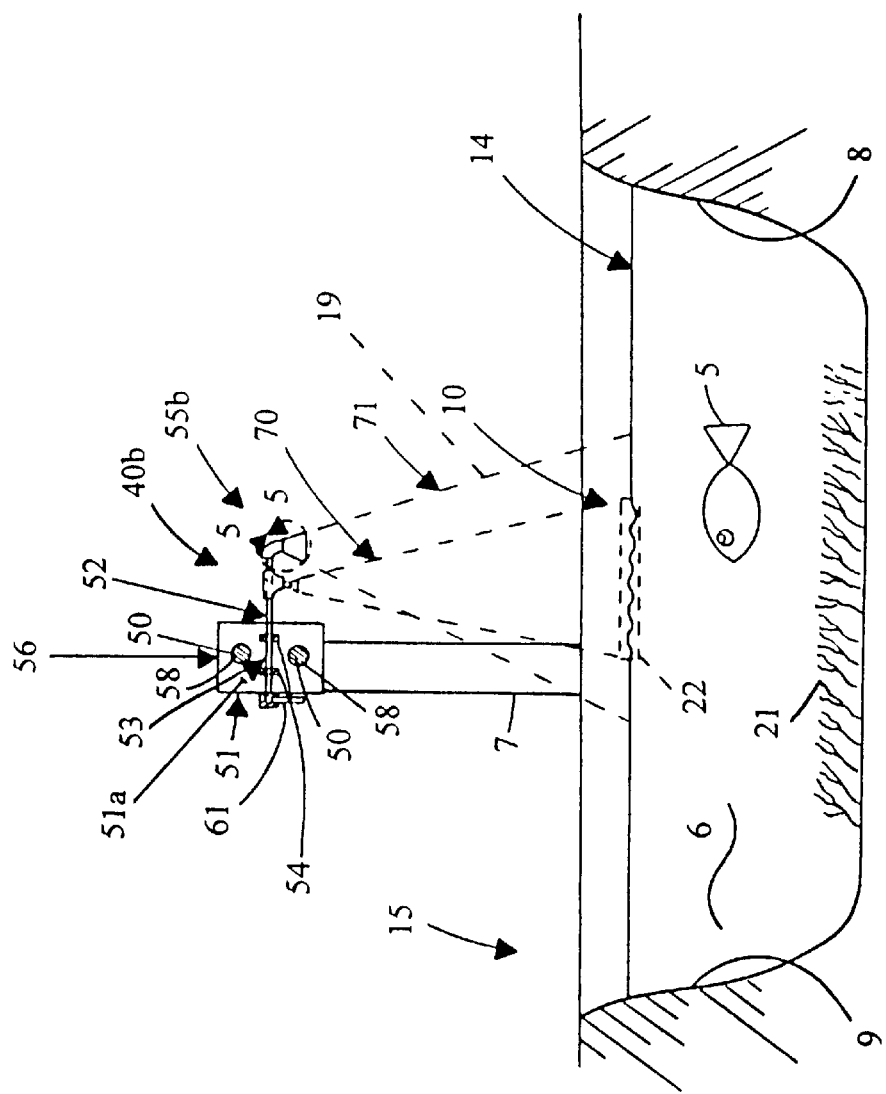
FIG. 2 is a cross-sectional view of the bypass guidance system taken along line 2—2 of FIG. 1.

FIGS. 1 and 2 show the present invention guiding anadromous fish 5 swimming in a river 6 between a near bank 8 and a far bank 9. Briefly, the key in carrying out one aspect of the present invention lays in generating a series of rippled regions 10 at an air-water interface 14 of the river 6.

As shown in FIG. 1, each rippled region 10 includes a head 11 and tail 12 and is arranged so that the tail 12 is contiguous with the head 11 of a neighboring rippled region 10 in head-to-tail fashion. For use in guiding fish 5 relative to an entry basin 15 to a facility by which the fish 5 may bypass a dam or lake (not shown), the rippled regions 10 are oriented along a path indicated by an arrow 13. For fish 5 encountering the first rippled region 10a, note that the same are re-directed along arrow 13 to the neighboring rippled region 10b, then to rippled region 10c and finally to rippled region 10d. Note that the rippled region 10d is positioned at an entry 17 of a bypass facility generally indicated at 20. In that way the fish 5 are guided to the bypass facility 20 which leads past the dam or artificial lake or the like.

FIG. 2 shows how the series of rippled regions 10 affect guidance of the fish 5. As schematically shown, artificial or natural light rays 19 refract diffusely at each of the series of rippled regions 10, creating aura-dominated regions 22, see FIG. 2, near the air-water interface 14. It is these aura-dominated regions 22 that elicit a learned response in the fish 5. That is, "silver underbodied" fish learn that the aura-dominated regions 22 provide refuge since they hide the fish 5 from predators in their natural environment that may or may not be below or around the aura-dominated regions 22.

Furthermore, note in FIG. 2 that a series of darkened, particularly light absorbing objects 21 are preferably placed below and parallel to the aura-dominated regions 22. The dark color of the objects 21 absorb light passing thereto from the air-water interface 14. That is to say, since the objects 21 are placed below the aura-dominated regions 22, they form a light absorbing path in the region immediately above the objects 21 thus preventing bottom light from being reflected up against the underside of the fish 5, which appears to elicit a strong response. The lateral extent of such dark or light absorbing path is parallel to that of and underneath the aura-dominated regions 22 to further encourage the fish 5 to remain with the safe path that the aura-dominated regions 22 establish. A light emitting bottom object, such as a UV light, or a darkened or covered surface to either side of the safe path provide areas that the fish 5 perceive as hazardous. The combined safe path and hazardous region attract fish 5 to a region in which they anticipate being unobservable to their natural predators, both within the water and/or above the air-water interface 14.

Figure 3:
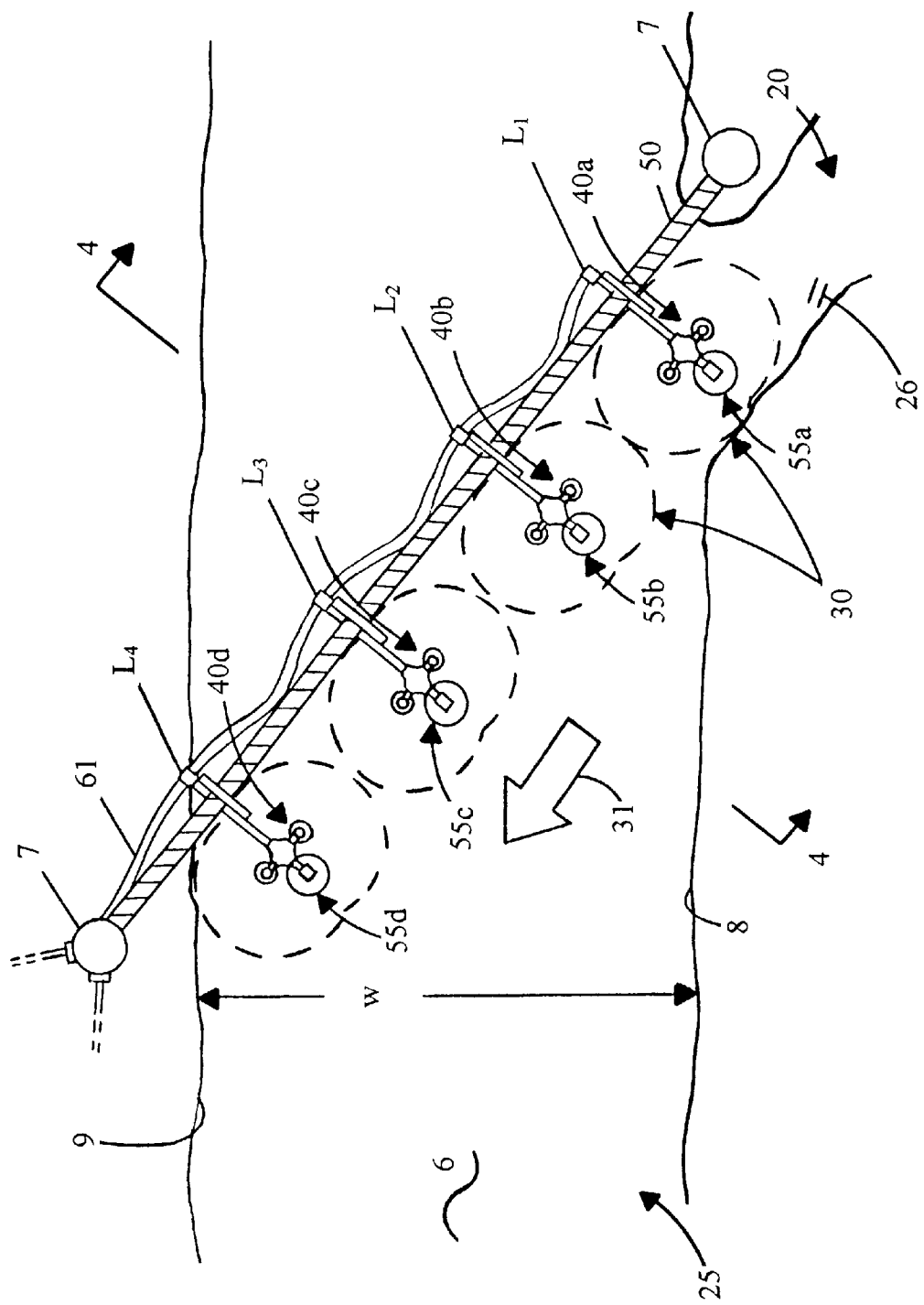
FIG. 3 is a plan view of an alternative embodiment bypass guidance system that deploys a series of shower and lamp assemblies at an exit basin.
Figure 4:
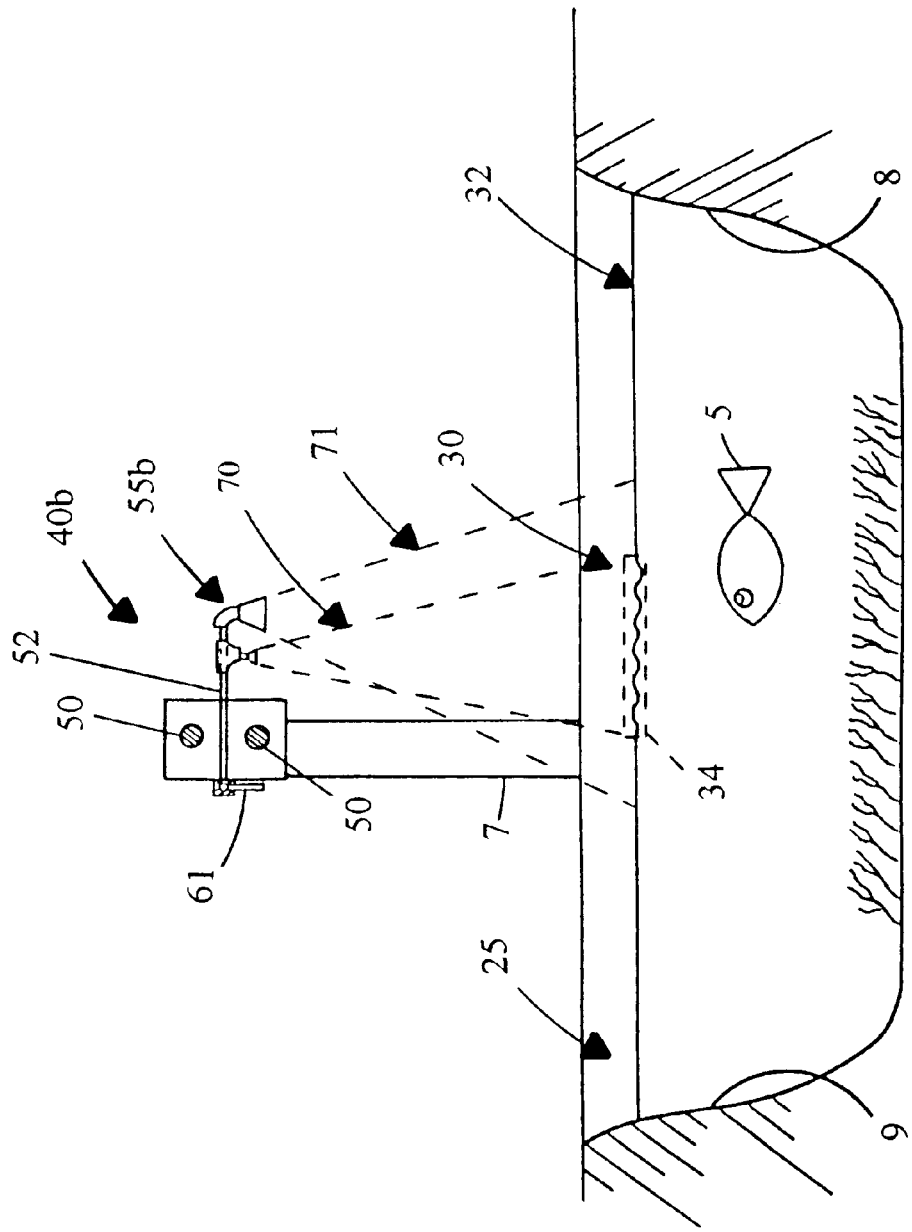
FIG. 4 is a cross-sectional view of the bypass guidance system taken along line 4—4 of FIG. 3.
Figure 7:
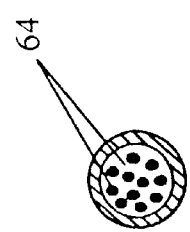
FIG. 7 is a cross-sectional view of the shower assembly taken along line 7—7 of FIG. 6.

FIGS. 3 and 4 illustrate a basin 25 for the river 6. The basin 25 is connected to exit basin 26 of the bypass facility 20. In accordance with the invention, a second series of rippled regions 30 is again created in the manner previously mentioned. With respect to an exit basin 26 of the bypass facility 20, the rippled regions 30 are reversed from that of the rippled regions 10 associated with the entry basin 15 described previously. Such rippled regions 30 are positioned along a path indicated by arrow 31 at an air-water interface 32. Light rays passing from top to bottom through the series of rippled regions 30 create aura-dominated regions 34 to elicit the previously noted response in the fish 5. Moreover, since predators are known to feed abundantly at a conventional basin, the fish 5 can rapidly and safely exit through the inventive basin 25 whereby usual migration timetables are maintained.

To establish the aura-dominated regions 22, 34, the present invention provides the following as shown in FIGS. 1–4, viz., a series of shower assemblies 40a, 40b, . . . , 40d arranged above the air-water interface 14 of the entry basin 15, as well as above the air-water interface 32 of the basin 25. When energized as explained in detail below, the shower assemblies 40a, 40b, . . . , 40d spray fluid in a pattern that disturbs the air-water interface 14 and 32 to establish the rippled regions 10 and 30 associated respectively with the entry and exit basins 15, 25. As explained in greater detail below, the shower assemblies 40a, 40b, . . . , 40d can be arranged in various different ways and in associations with various artificial and natural elements to guide fish 5 along a previously selected path.

LINEAR ALIGNMENT

As shown in FIGS. 1–4, if the width W between the far and near banks 9, 8, respectively of the entry and exit basins 15, 25 is comparatively narrow, a pair of overhead cables 50 can be stretched, one above the other, over the air-water interface 14 and 32 between towers 7 implanted in the near and far banks 8, 9. For example with regard to the entry basin 15, the cables 50 extend diagonally from far bank 9 to the near bank 8 adjacent to the bypass facility 20. Along the cables 50, a series of lamp assemblies 55a, 55b, . . . , 55d along with the previously mentioned shower assemblies 40a, 40b, . . . , 40d cantilever from the cables 50 at selected locations L1, L2 . . . L4, for example equi-spaced therealong.

FIG. 2 shows how the shower assembly 40b and lamp assembly 55b attach relative to the pair of cables 50. As shown in that FIG., the shower assembly 40b and lamp assembly 55b attach at a far end region of a light weight plastic pipe 52 that attaches at near end region 53 to the pair of cables 50 via a rectangularly-shaped anchor plate 51 and U-shaped fasteners 54. The anchor plate 51 includes openings 58 through which the cables 50 extend. Fasteners 56 are threaded into contact with the peripheries of the cables 50 to fixedly attach the latter relative to the anchor plate 51. The U-shaped fasteners 54 clamp the near end region 53 of the pipe 52 against a broad surface 51a of the anchor plate 51.

FIGS. 5–8 show the shower assembly 40b and the lamp assembly 55b in further detail. Since the description of each is typical, its detail will be omitted from the description of other embodiments.

Figure 6:
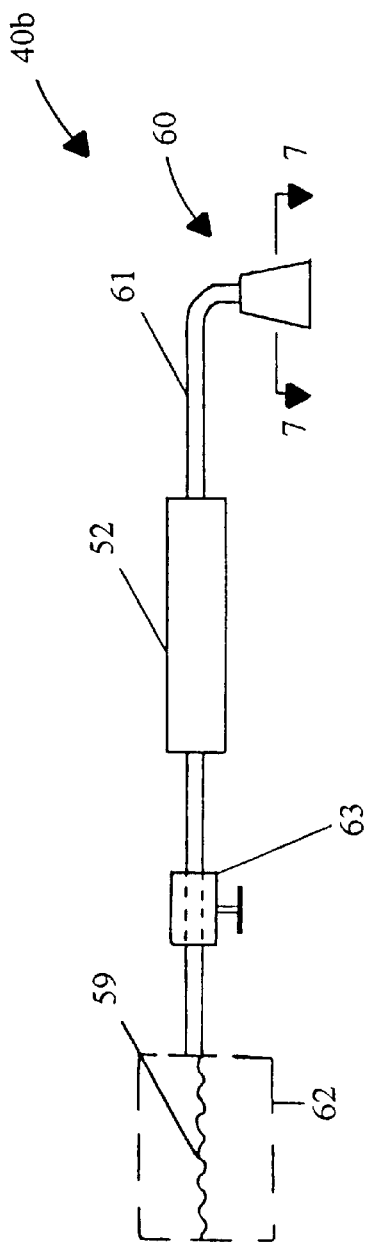
FIG. 6 is schematic diagram depicting one of the shower assemblies used in the bypass guidance systems that are illustrated in FIGS. 1–4.

FIG. 6 illustrates a typical shower assembly 40b showing only one of a pair of shower heads 60, a conduit 61 that has a portion that fits within each of the plastic pipes 52 of FIGS. 2 and 4, and a portion exterior thereof as shown in FIGS. 1–4. The conduit 61 conducts fluid 59 from a source 62 to the shower heads 60 through a valve 63 or an equivalent ON-OFF device. The shower heads 60 each includes a series of openings 64, which during operations create the above-mentioned pattern of disturbed air-water interface rippled regions 10, 30. The fluid 59 is preferably water, but can be air.

Figure 5:
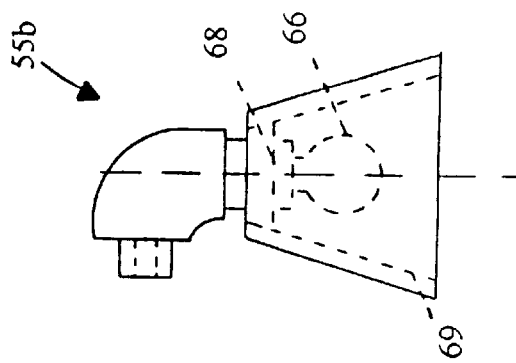
FIG. 5 is a detail view illustrating a lamp assembly used in the bypass guidance systems taken along line 5—5 of FIG. 2.
Figure 8:
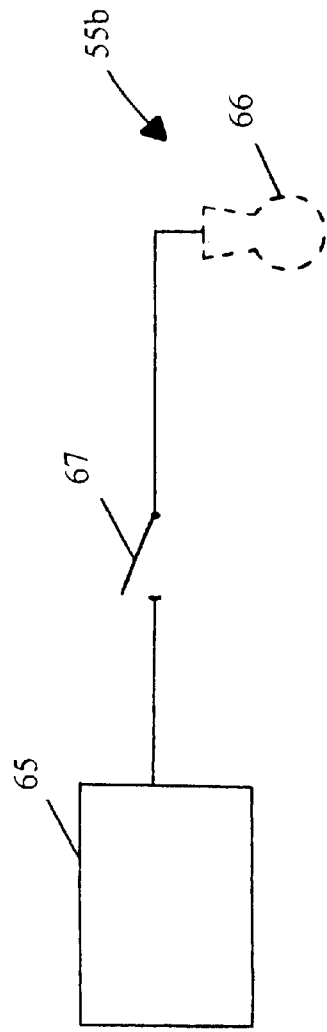
FIG. 8 is a schematic diagram depicting one of the lamp assemblies used in the bypass guidance system that are illustrated in FIGS. 1–4.

In FIG. 8, a typical lamp assembly 55b is schematically shown and includes an energy source 65 connected to an incandescent bulb 66 through a switch 67. As shown in FIG. 5, a socket 68 receives the bulb 66 that is surrounded by a lampshade 69.

FIGS. 2 and 4, depict a spray pattern 70 provided by the shower assembly 40b. Note that the sizes of the spray pattern 70 and the light pattern 71 are constant and positioned adjacent and parallel to the cables 50, as illustrated in FIGS. 1 and 3.

Figure 9:
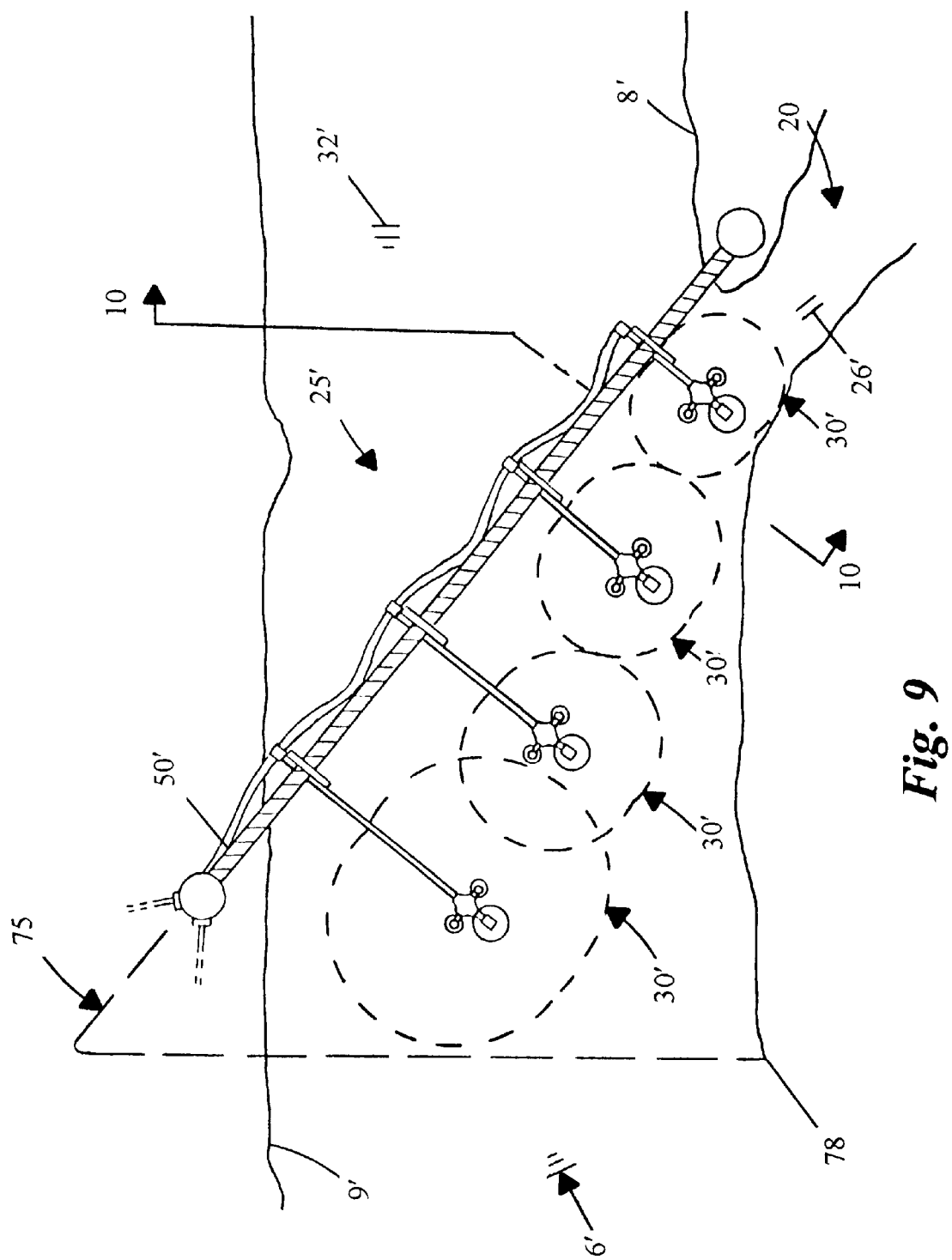
FIG. 9 is a plan view illustrating yet another embodiment of the bypass guidance system of the present invention that deploys a series of shower and lamp assemblies at an exit basin.
Figure 10:
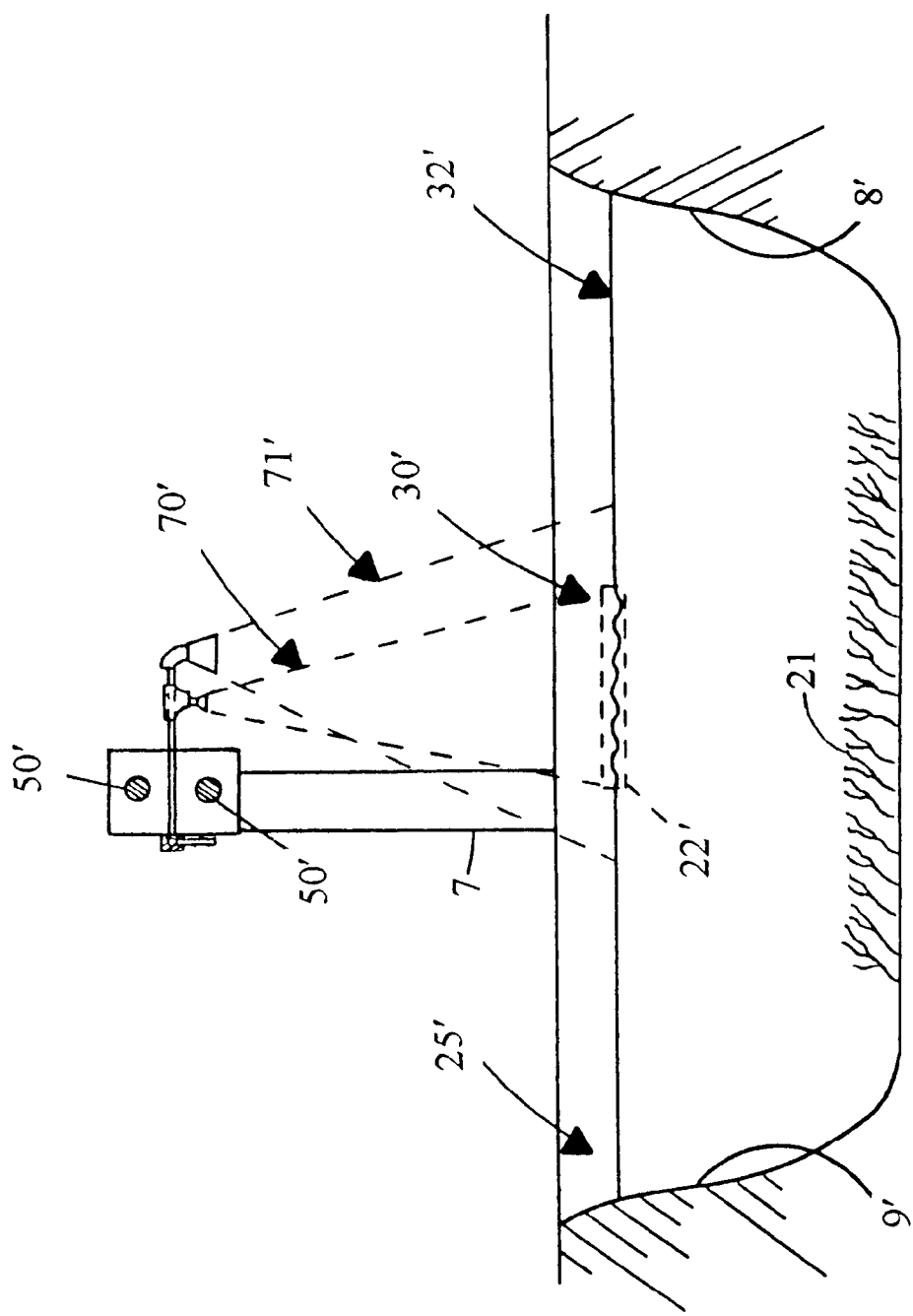
FIG. 10 is a cross-sectional view of the bypass guidance system taken along line 10—10 of FIG. 9.

In FIGS. 9 and 10 the sizes of the rippled regions 30' at the air-water interface 32 of the river 6 as well as aura-dominated regions 22 increase in size beginning with the smallest near the exit basin 26 of the basin 25 adjacent to the near bank 8' and the largest at near the far bank 9'. As shown in FIG. 10, the sizes of the spray and light patterns 70', 71' have been similarly changed in various amounts with respect to the constant size shown in FIG. 3. In the instance of an entry basin 15 such as illustrated in FIG. 1, the spray and light patterns 70, 71 would be similar, viz., smaller at the entry 17 of FIG. 1 and largest near the far bank 9. In this way the series of rippled regions 30' depicted in FIG. 9 when viewed from above establish a triangularly-shaped outline 75 thus providing a tapered path for guiding fish 5. As shown, the triangularly-shaped outline 75 has an apex near the exit basin 26.

Furthermore, note in FIG. 10 that a series of objects 21 are preferably placed adjacent to the far bank 9 in positions that are below, but parallel to the aura-dominated regions 22. The dark color of the objects 21 absorbs light passing thereto from the air-water interface 32. That is to say, since the objects 21 are placed below the aura-dominated regions 22, they form a light absorbing path in the region immediately above the objects 21. The dark objects 21 establish a safe path for the fish 5 that runs along and underneath the aura-dominated regions 22 to further encourage the fish 5 to remain with the safe path established by the aura-dominated regions 22. The combined safe path and hazardous region encourage "silver underbodied" fish 5 to perceive that while in aura-dominated regions 22 they are unobservable to predators either within the water and/or above the air-water interface 32.

Figure 11:
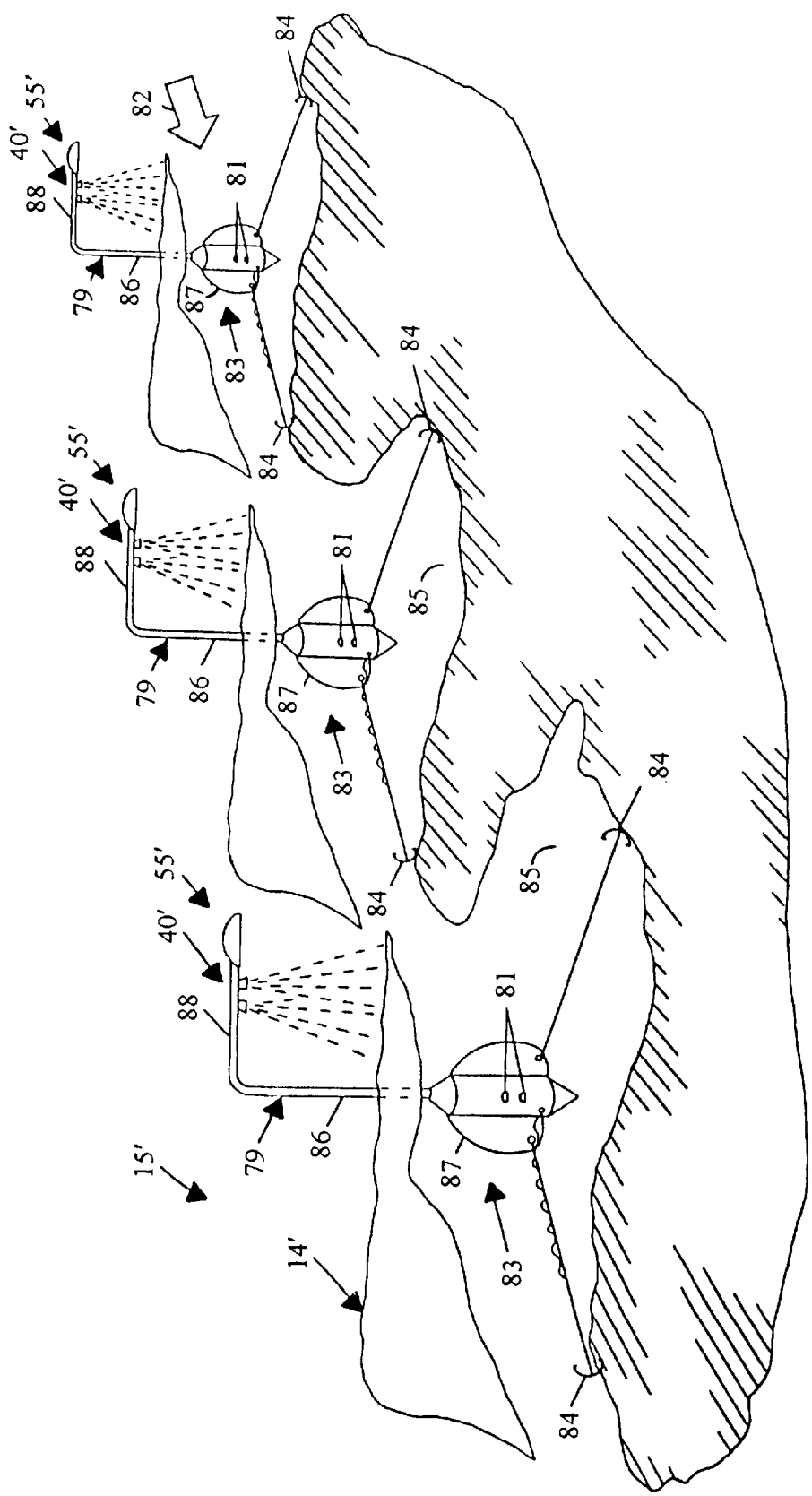
FIG. 11 is a perspective view illustrating another alternative embodiment bypass guidance system in accordance with the present invention.

In another embodiment in FIG. 11, a series of buoys 83 are anchored via anchor means 84 to the bottom 85 of the basin 15 or 25 along a path indicated by arrow 82. Each buoy 83 includes a L-shaped tubular support 79 having a far leg 88 extending out over the air-water interface 14 and a near leg 86 that projects upward from a float 87 of the buoy 83. The float 87 includes ports 81 that admit water into the float 87, and encloses a pump (not illustrated) that receives electrical power from a source located outside the basin 15 or 25. Each of the buoys 83 includes shower and lamp assemblies 40, 55 similar to those described above. The pump within the float 87 has an output that connects to the conduit 61 of FIG. 4, the latter extending through near and far legs 86, 88 to shower heads 80 in the far leg 88. Water from the pump produces the rippled regions 10, 30 or 30' described previously. The lamp assembly 55' also receives electrical power from a source outside the basin 15 or 25. The lamp assembly 55' includes an incandescent bulb 66 positioned in far leg 88 that is received by the socket 68 and surrounded by the lampshade 69.

Figure 12:
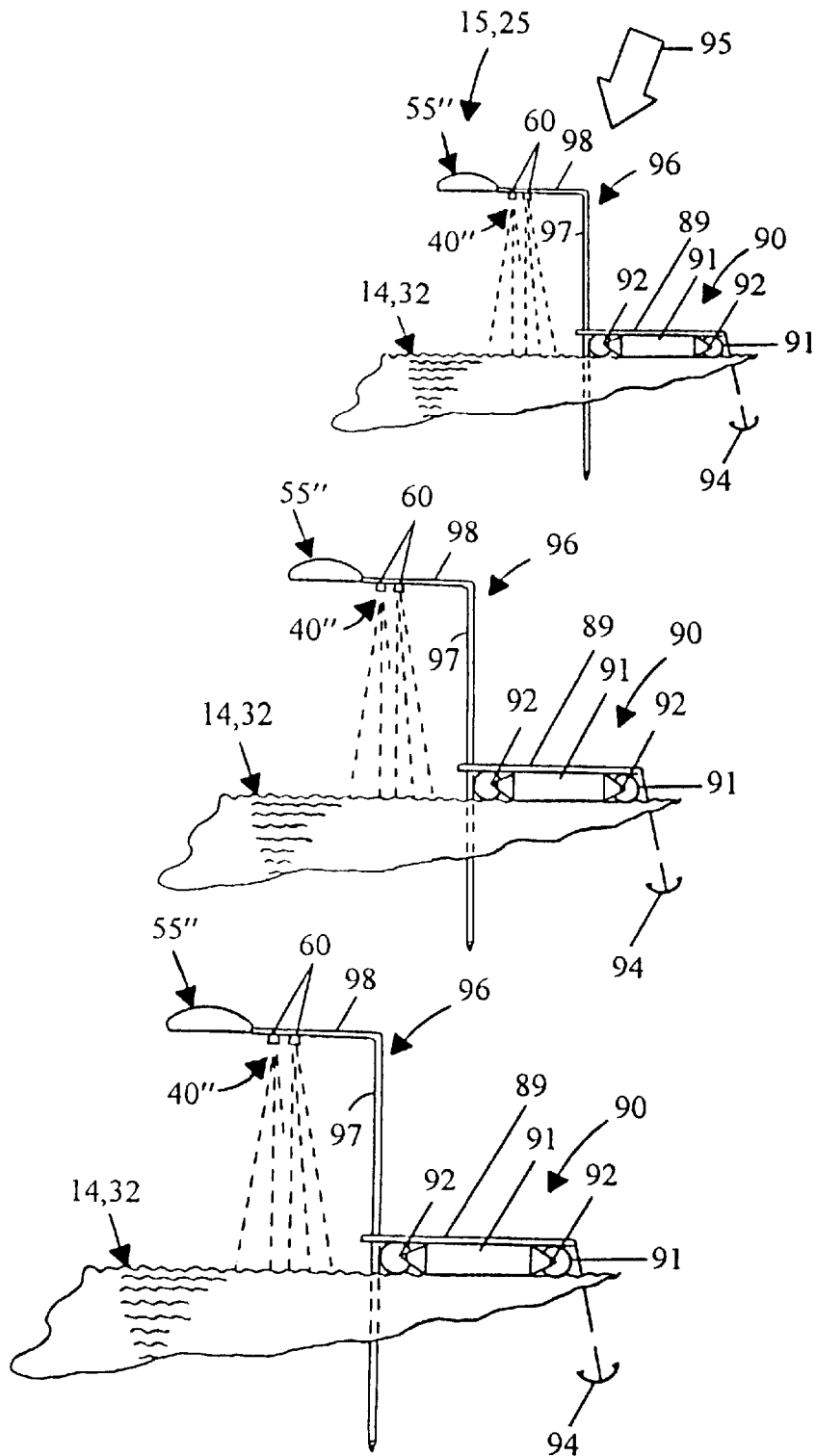
FIG. 12 is a perspective view illustrating yet another alternative embodiment alternative embodiment bypass guidance system in accordance with the present invention.

Yet another embodiment illustrated in FIG. 12 includes a series of rectangularly-shaped rafts 90 that ride at the air-water interfaces 14 or 32 on four floats 91. The floats 91 have ends 92 that are tied together to establish the rafts 90 rectangular shape. The rafts 90 are moored via mooring means 94 to the bottom 85 of the basin 15 or 25 along a path indicated by arrow 95. Each raft 90 has a floor 89 through which an L-shaped supports 96 extends. Each of the L-shaped supports 96 has a first arm 97 attached to and extending through the floor 89 and air-water interface 14 or 32 to a pump (not shown). The pump receives electrical power from outside the basin 15 or 25. Each of the rafts 90 includes shower and lamp assemblies 40", 55" similar to those described above. The shower assembly 40" for example, can include the pump within the first arm 97 having an output connected to the conduit 61 of FIG. 4. The conduit 61 extends through the first arm 97 and thence through a second arm 98 to connect to shower heads 60 located an end of the second arm 98. Water from the pump produces the rippled regions 10, 30, 30' as previously described. Electrical power is also supplied to the lamp assembly 55" from outside the basin 15 or 25. Each lamp assembly 55" includes incandescent bulb 66 that is received by the socket 68 and surrounded by the lampshade 69.

Figure 13:
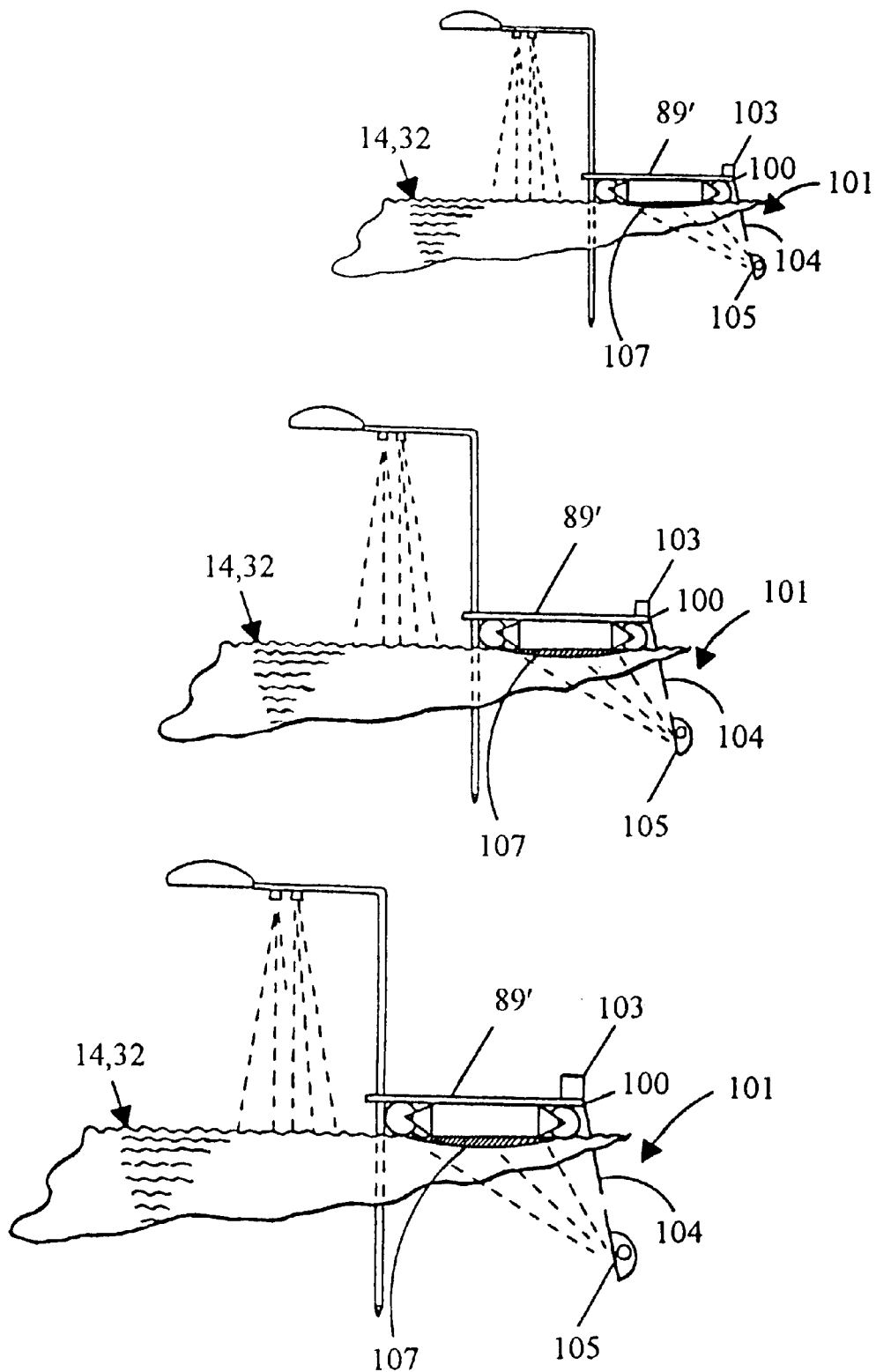
FIG. 13 is a perspective view illustrating still another alternative embodiment alternative embodiment bypass guidance system in accordance with the invention.
Figure 14:
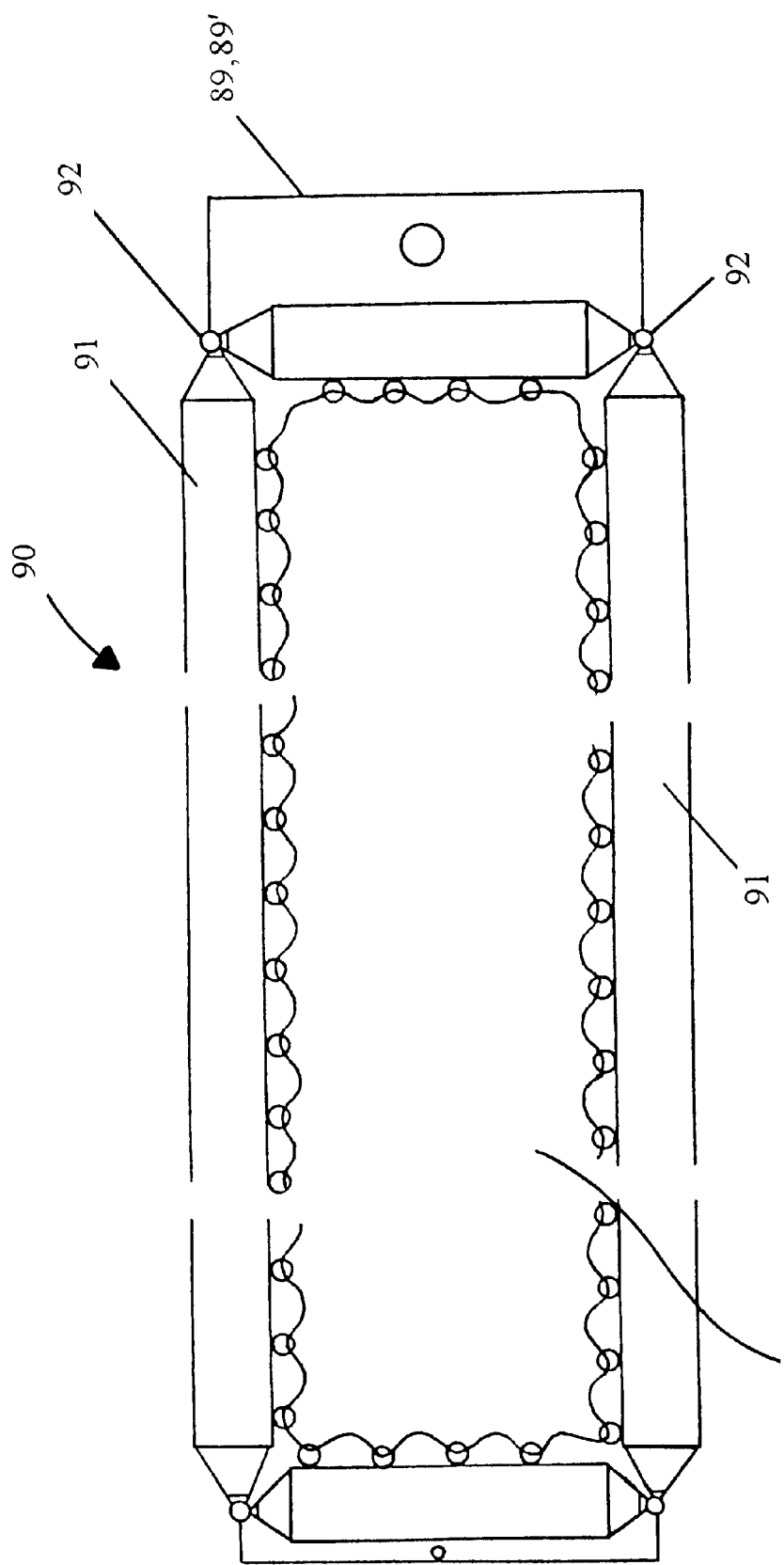
FIG. 14 is a bottom view illustrating a raft used in the embodiments of bypass guidance system depicted in FIGS. 12 and 13.

In still another embodiment in FIG. 13, the floor 89' includes an aft region 100 which supports a secondary lamp sub-assembly 101. Each secondary lamp sub-assembly 101 has a drum 103 from which hangs a line 104 that extends to a secondary incandescent lamp fixture 105 that is submerged below the air-water interface 14 or 32. The length of the line 104 and the lamp fixture 105 are arranged to direct light upward toward the air-water interface 14 or 32 along a slope aligned along the fish guidance path. Each of the rafts 90 includes a blackened-underside 107, illustrated in FIG. 14, that the upwardly directed light illuminates. Absorption of light by the blackened-underside 107 together with illuminating silver colored fish 5 alarms them. Thus by cantilevering the lamp fixtures 105 from the aft region 100 of each raft 90 that points away from the direction along which fish 5 are to be guided keeps the migrating fish 5 moving along that path and aids in deterring them from circling back through a vertical plane past the series of the rafts 90.

MULTIPLE GRID

Figure 15:
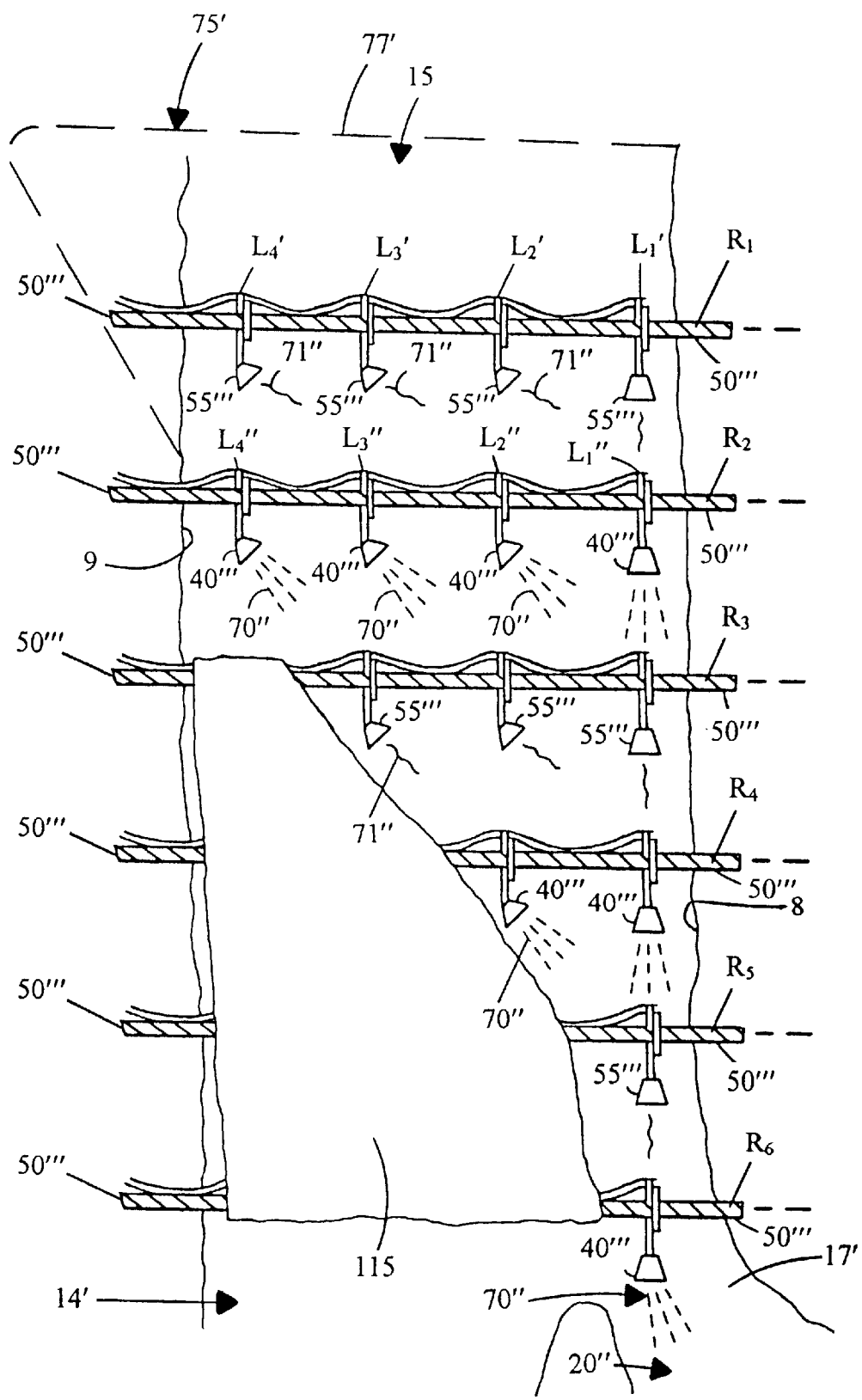
FIG. 15 is a plan view illustrating still another alternative embodiment bypass guidance system in accordance with the present invention that deploys a series of shower and lamp assemblies at an entry basin.

In still another embodiment illustrated in FIG. 15 a grid is made up of rows R1, R2 . . . R6 of shower and lamp assemblies 40''', 55''', each being constructed as described above. Row R1, for example contains a group of lamp assemblies 55''' equally spaced therealong at locations L1' . . . L4' wherein location L1' is adjacent to near bank 8 and location L4' is closely adjacent to the far bank 9. Similarly, row R2 contains a group of shower assemblies 40''' equally spaced therealong as shown at locations L1", L2" . . . L4" wherein location L1" is adjacent to near bank 8 and location L4" is adjacent to the far bank 9. Rows R3 . . . RX contain other groups of shower and lamp assemblies 40''', 55''' in similar fashion except having fewer assemblies. The triangularly-shaped outline 75' in plan view has an apex near the entry 17' of the bypass facility 20". In the basin 25, the triangularly-shaped outline 75' would be reversed as hereinbefore described.

For an embodiment of the invention such as that depicted in FIG. 15, a triangular-shaped canopy 115 having an outline that complements the aura-dominated triangularly-shaped outline 75' can be stretched across the several pairs of cables 50'''. During daylight hours the canopy 115 establishes a darkened, shadowed region by blocking light from the air-water interface 14''' and from penetrating into the water. As described above, such a darkened region assists in guiding migrating "silver underbodied" fish 5 such as salmons and Delta Smelt by creating a region which they perceive as hazardous.

Figure 16:
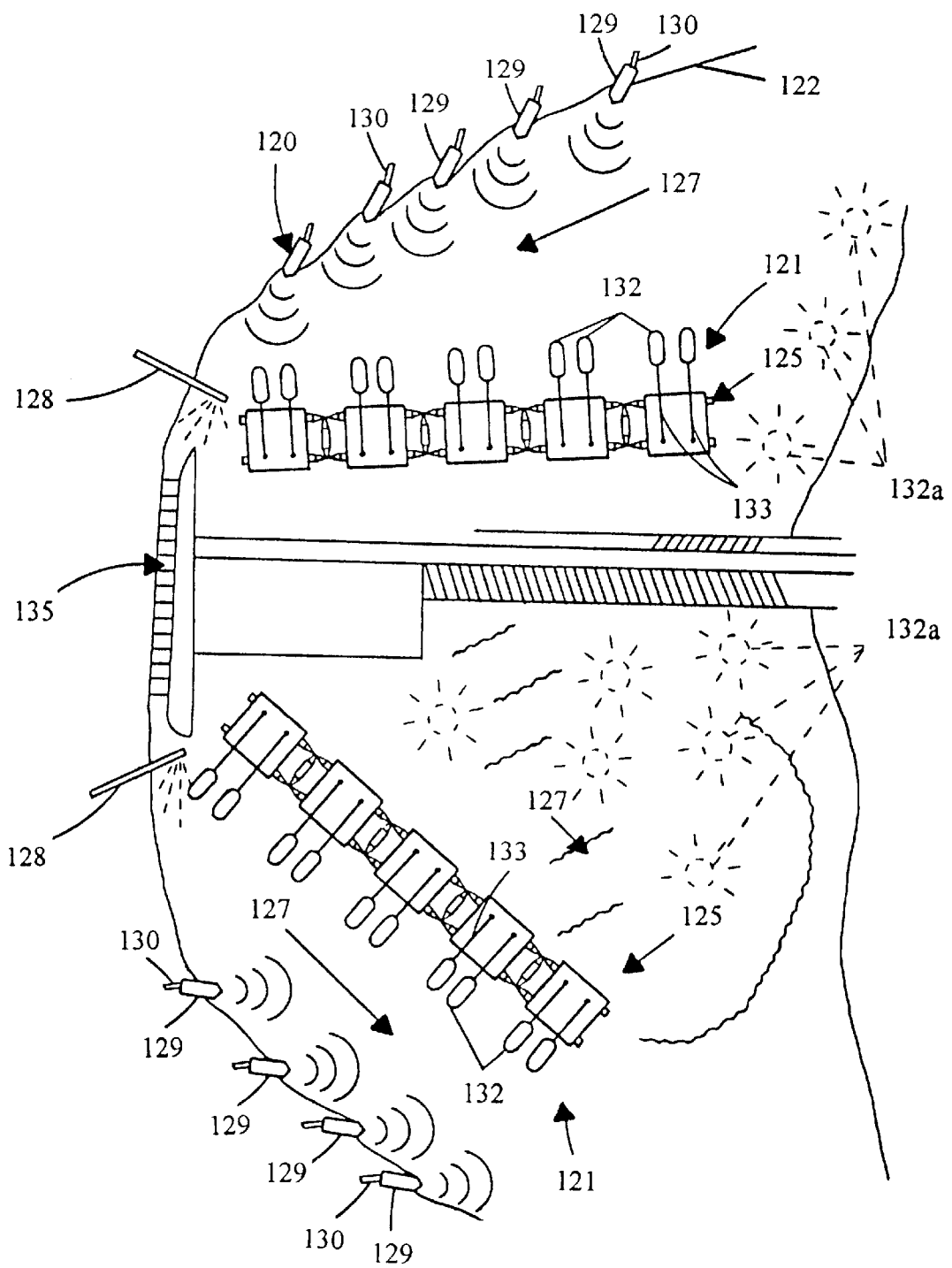
FIG. 16 is a plan view illustrating still yet another alternative embodiment bypass guidance system in accordance with the invention that deploys a series of shower and lamp assemblies at a fish ladder separating entry and exit basins.

In still another embodiment of the present invention depicted in FIG. 16 separates shower assemblies 120 from lamp assemblies 121 so they face each other. For example, as illustrated in FIG. 16 the shower assemblies 120 may be located on the near bank 122 while the lamp assemblies 121 are carried by rafts 125 floating adjacent to the near bank 122. Arranging the shower assemblies 120 and lamp assemblies 121 in this way establishes a 3D aura-dominated path 127 between the rafts 125 and the near bank 122. The shower assemblies 120 include two types of dispensers for the fluid. At each end of the bypass facility, i.e. a fish ladder 135 in the illustration of FIG. 16, the bypass guidance system preferably uses a conventional shower 128 as described previously. At other locations along the near bank 122 the bypass guidance system uses a series of nozzles 129 that are connected by conduits 130 to a source of fluid. The nozzles 129, carried by guide supports (not shown), direct a spray of fluid at the air-water interface 131 in a specified direction. Preferably, the quantity and force of the sprayed water is sufficient to induce an artificial surface current, preferably at least 1.0 to 2.0 cm deep, moving along the desired path toward and into the bypass facility, in this instance the fish ladder 135. Each lamp assembly 121 includes a series of lamp sub-assemblies 132 supported on the series of rafts 125 using L-shaped supports 133 as described previously. A combination of the nozzles 129 with the lamp assemblies 121 and the shower 128 surprising enhances timely migration of the fish 5. Still further, note that the bypass guidance system also includes a series of underwater, upwardly directed secondary lamp sub-assemblies 132a secured underwater in regions outside of the aura-dominated path 127 beyond the rafts 125 to create an environment away from the aura-dominated path 127 that the fish 5 perceive as hazardous. The light from these lamps does not reach the aura-dominated path 127.

Figure 17:
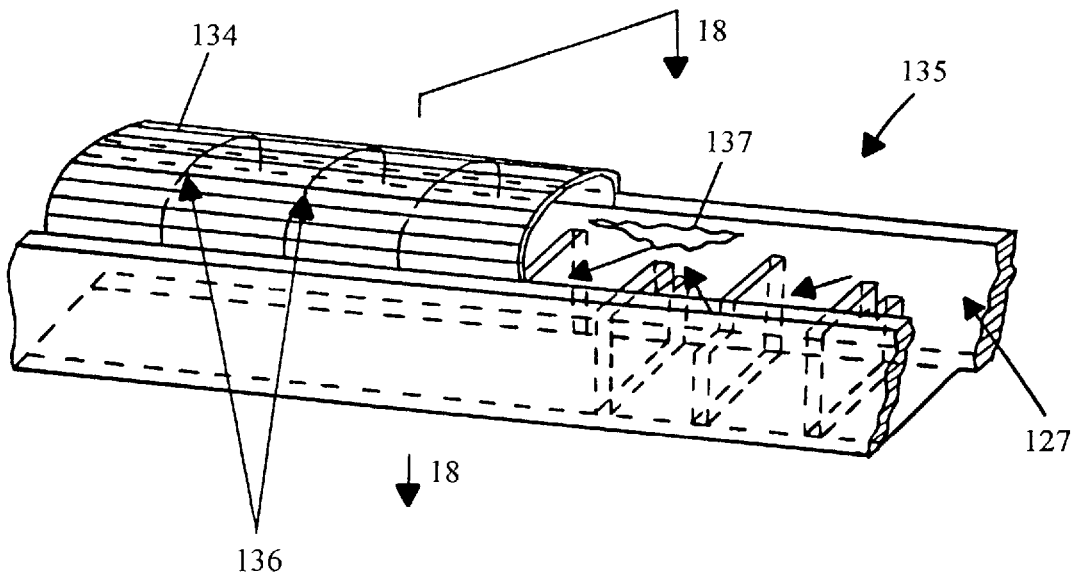
FIG. 17 is a perspective view of a fish ladder depicted in FIG. 16.
Figure 18:
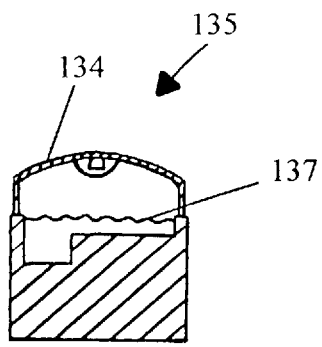
FIG. 18 is a cross-sectional view of the fish ladder taken along line 18—18 of FIG. 17.
Figures 19, 21:
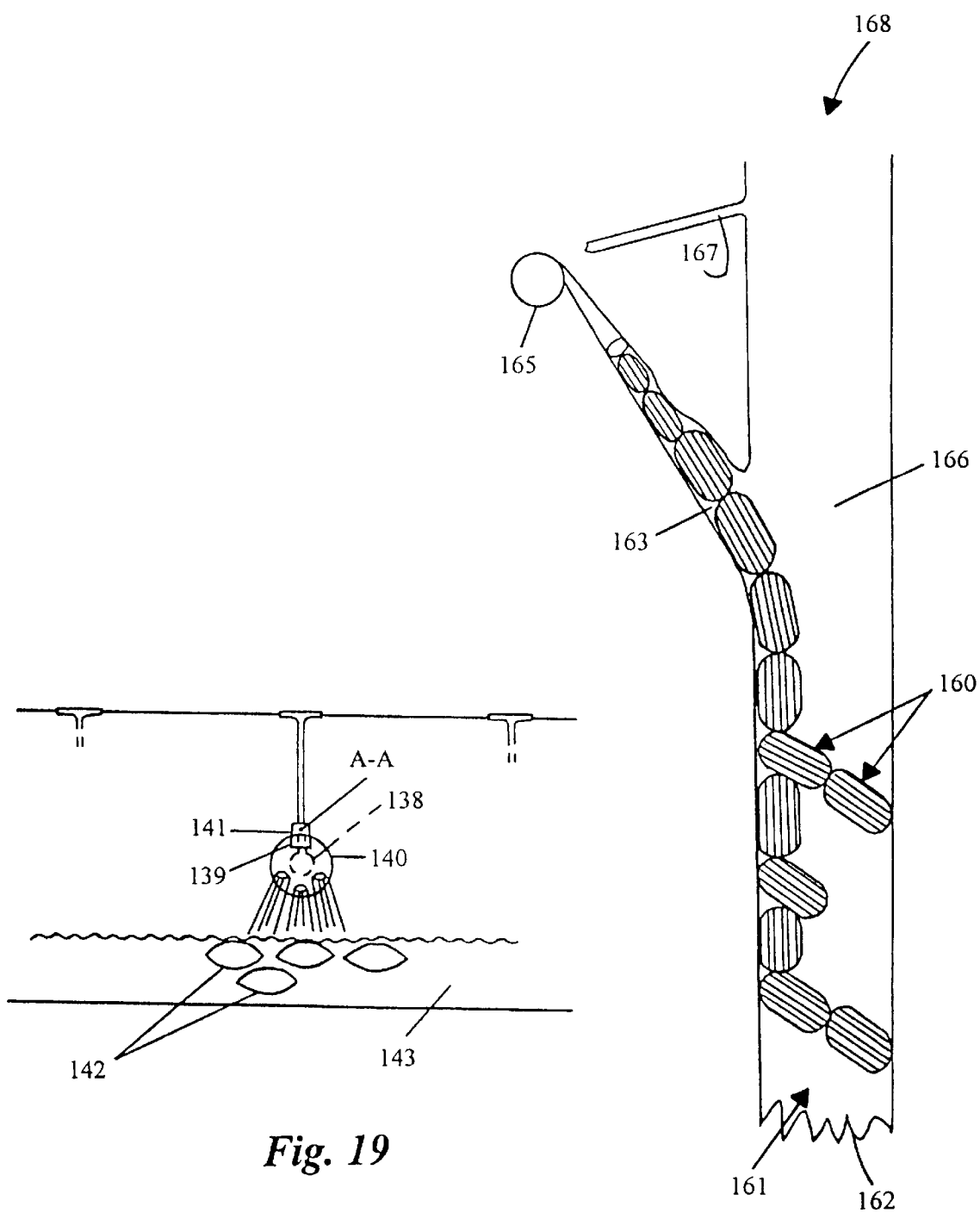
FIG. 19 is a partial schematic elevational view of the fish ladder depicted in FIG. 17 showing a rotating lamp assembly.
FIG. 21 is a plan view of yet still another alternative embodiment bypass guidance system in accordance with the present invention adapted for use with catadromous fish.

FIGS. 17 and 18 depict a modification of the fish ladder 135 that is covered by a semi-transparent canopy 134. A series of lamp assemblies 136 are suspended over the fish ladder 135 beneath the semi-transparent canopy 134 above the air-water interface 137 of the fish ladder 135. Each of the lamp assemblies 136 has the same elements as described previously except that a bulb 138 and a socket 139 depicted in FIG. 19 are surrounded by a perforated shade 140, and that a gear assembly 141 rotates about axis A-A. The floor and side walls of the fish ladder 135 should be of a dark, light absorbing color to increase the attractiveness of the aura-dominated path 127. In this way light patches 142 appear in and move about a floor 143 of the fish ladder 135 to aid fish migration. During daylight hours the semi-transparent canopy 134 shades the fish ladder 135 but permits dim sunlight to enter which enhances the effect of the series of lamp assemblies 136.

Figure 20:
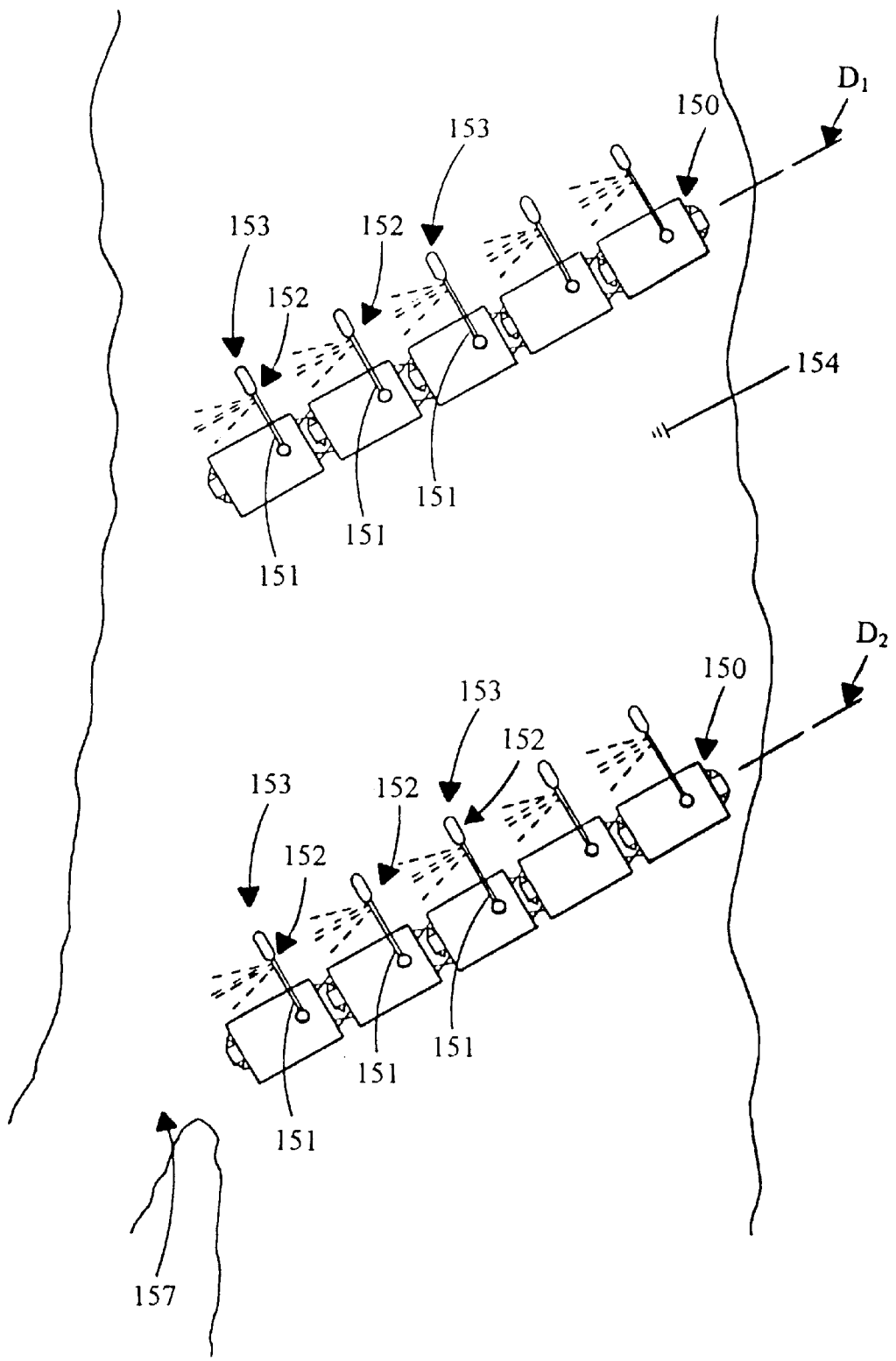
FIG. 20 is a plan view of sill yet another alternative embodiment bypass guidance system in accordance with the present invention that deploys a series of shower and lamp assemblies at an entry basin.

Yet still another embodiment of the present invention depicted in FIG. 20 uses a double row of rafts 150 arranged along parallel diagonals D1 and D2 instead of the single row of rafts as shown in FIGS. 12, 13 and 16. The rafts 150 are similar to those previously described and include L-shaped supports 151 similar to those described in FIGS. 12 and 13 including shower and lamp assemblies 152, 153 located above the air-water interface 154 upstream of the migrating fish 5. Note that last row of rafts 150 arranged along the diagonal D2 is located adjacent to the bypass facility 157. When employed in an exit basin (not shown), the pattern of the rafts 150 when viewed from above reverses.

CATADROMOUS FISH

For catadromous fish 5, the present invention elicits the desired response by artificially creating a series of shadowed or dark regions 160 illustrated in FIG. 21. The regions 160 are arranged head-to-tail in a selected direction or directions across an entry basin 161 near the dam's or lake's bypass facility in which an entryway 162 allows most of such fish to enter. A narrowed exit 163 is provided at one of the last regions 160 which leads to a holding tank 165. The holding tank 165 is located opposite the dam's or artificial lake's bypass facility provided for the anadromous fish 5 previously described with respect to FIGS. 1–20. In accordance with the present invention, the shadowed regions 160 may be created by the blackened-underside 107 of rafts 90 depicted in FIG. 14 illuminated by light from the lamp fixtures 105. Such lamp fixtures 105 as previously described in this application, create shadow regions and elicit a learned response for the catadromous fish 5 to follow the shadowed regions 160 illustrated in FIG. 21. The darken regions 160 are stimuli for the catadromous fish 5 which elicit a learned response in such fish 5 that the shadowed-dominated path is a safe one since their presence is hidden from predators. As a result, the passage of catadromous fish 5 is surprisingly rapid through the holding tank 165 and thence through exit 167 to the exit basin 168.

In many instances, the exit 167 of the holding tank 165 is directly connected to the exit basin 168 so that the catadromous fish 5 can be easily transported. But in many cases, the exit 167 could be blocked and the catadromous fish 5 trapped. Hauling can be used to transport the catadromous fish 5 to the opposite basin of the dam or lake. Or the trapped catadromous fish 5 could be disposed of commercially or in an appropriate manner if such fish 5 are determined to be deleterious to the existence of the anadromous fish 5 co-migrating therewith.

Although the present invention has been described in terms of the presently preferred embodiment, it is to be understood that such disclosure is purely illustrative and is not to be interpreted as limiting. For example, a fish guidance system in accordance with the present invention could be used advantageously in controlled harvesting of anadromous and/or catadromous fish. Alternatively, the fish guidance system can guide and pass fish around natural, i.e. non-manmade obstacles such as large water-falls, or rocky cataracts thereby opening access to new spawning grounds. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A method for guiding fish through a basin associated with a bypass facility disposed at an obstacle in a watercourse, the method comprising the steps of:

disposing above a surface of water in the basin a plurality of shower assemblies that are spaced apart at locations along a path to be traversed by fish;

supplying to the shower assemblies a fluid which the shower assemblies direct toward the surface of the water to create thereat disturbed air-water interface regions; and shading the water surface outside of and adjacent to the disturbed air-water interface regions.

2. The method of claim 1 wherein the shower assemblies are supported above the surface of the water of the basin by cables stretched over the basin.

3. The method of claim 2 wherein the disturbed air-water interface regions are contiguous and when viewed from above have an outline, and wherein shading the water surface outside of and adjacent to the disturbed air-water interface regions is effected by disposing a canopy on the cables which shadows the surface of the water outside of and adjacent to the outline of the contiguous disturbed air-water interface regions.

4. The method of claim 1 wherein the disturbed air-water interface regions are contiguous and when viewed from above have an outline, and wherein shading the water surface outside of and adjacent to the disturbed air-water interface regions is effected by disposing rafts on the water adjacent to the outline of the contiguous disturbed air-water interface regions which shadows the water beneath the rafts.

5. The method of claim 1 wherein the shower assemblies are supported above the surface of the water of the basin by buoys anchored within the basin.

6. The method of claim 1 wherein the shower assemblies are supported above the surface of the water of the basin by rafts moored within the basin.

7. The method of claim 6 wherein rafts have blackened-undersides, the method further comprising the step of disposing secondary lamp sub-assemblies beneath the surface of the water that are adapted for artificially illuminating the blackened-undersides of rafts.

8. The method of claim 1 wherein the fluid supplied to the shower assemblies is water.

9. The method of claim 1 wherein the fluid supplied to the shower assemblies is air.

10. The method of claim 1 wherein the disturbed air-water interface regions are contiguous.

11. The method of claim 10 wherein the contiguous disturbed air-water interface regions when viewed from above have an outline.

12. The method of claim 10 wherein an outline of the contiguous disturbed air-water interface regions when viewed from above has an apex that is located near the bypass facility.

13. The method of claim 1 further comprising the step of disposing a plurality of lamp assemblies adapted for artificially illuminating the disturbed air-water interface regions.

14. The method of claim 13 wherein the plurality of lamp assemblies equals in number the plurality of shower assemblies.

15. The method of claim 14 wherein each of the lamp assemblies is located near one of the shower assemblies.

16. The method of claim 13 wherein the lamp assemblies are located near shower assemblies.

17. A method for guiding fish comprising the steps of:
disposing above a surface of a body of water a plurality of shower assemblies that are spaced apart at locations along a path to be traversed by fish
supplying to the shower assemblies a fluid which the shower assemblies direct toward the surface of the body of water to create thereat disturbed air-water interface regions; and
shading the water surface outside of and adjacent to the disturbed air-water interface regions.

18. The method of claim 17 wherein the shower assemblies are supported above the body of water by cables stretched over the body of water.

19. The method of claim 18 wherein the disturbed air-water interface regions are contiguous and when viewed from above have an outline, and wherein shading the water surface outside of and adjacent to the disturbed air-water interface regions is effected by disposing a canopy on the cables to shadow the surface of the water outside of and adjacent to the outline of the contiguous disturbed air-water interface regions.

20. The method of claim 17 wherein the disturbed air-water interface regions are contiguous and when viewed from above have an outline, and wherein shading the water surface outside of and adjacent to the disturbed air-water interface regions is effected by disposing rafts on the water adjacent to the outline of the contiguous disturbed air-water interface regions to shadow the water beneath the rafts.

21. The method of claim 17 wherein the shower assemblies are supported above the body of water by buoys anchored within the body of water.

22. The method of claim 17 wherein the shower assemblies are supported above the body of water by rafts moored within the body of water.

23. The method of claim 22 wherein the rafts have blackened-undersides, the method further comprising the step of disposing secondary lamp sub-assemblies beneath the surface of the water that are adapted for artificially illuminating the blackened-undersides of rafts.

24. The method of claim 17 wherein the fluid supplied to the shower assemblies is water.

25. The method of claim 17 wherein the fluid supplied to the shower assemblies is air.

26. The method of claim 17 wherein the disturbed air-water interface regions are contiguous.

27. The method of claim 26 wherein the contiguous disturbed air-water interface regions when viewed from above have an outline.

28. The method of claim 17 further comprising lamp assemblies adapted for artificially illuminating the disturbed air-water interface regions.

29. The method of claim 28 wherein the plurality of lamp assemblies equals in number the plurality of shower assemblies.

30. The method of claim 29 wherein each of the lamp assemblies is located near one of the shower assemblies.

31. The method of claim 28 wherein the lamp assemblies are located near shower assemblies.

32. A method for guiding fish comprising the steps of:
disposing along a bank adjacent to a body of water a plurality of nozzles that are spaced apart along the bank and are oriented to direct a spray of water onto the body of water along a path to be traversed by fish; and
supplying to the nozzles a flow of water which the nozzles direct onto the body of water to create thereat disturbed air-water interface regions in which water moves in a direction to be traversed by fish.

33. A method for guiding fish comprising the steps of:
disposing along a bank adjacent to a body of water a plurality of nozzles that are spaced apart along the bank and are oriented to direct a spray of water onto the body of water along a path to be traversed by fish;
supplying to the nozzles a flow of water which the nozzles direct onto the body of water to create thereat disturbed air-water interface regions in which water moves in a direction to be traversed by fish; and
shading the water surface outside of and adjacent to the disturbed air-water interface regions.

34. A method for guiding fish through a basin associated with a bypass facility disposed at an obstacle in a watercourse, the method comprising the steps of:
disposing above a surface of water in the basin a plurality of shower assemblies that are spaced apart at locations along a path to be traversed by fish;
supplying to the shower assemblies a fluid which the shower assemblies direct toward the surface of the water to create thereat disturbed air-water interface regions; and
disposing a plurality of lamp assemblies adapted for artificially illuminating the disturbed air-water interface regions.

35. The method of claim 34 wherein the shower assemblies are supported above the surface of the water of the basin by cables stretched over the basin.

36. The method of claim 35 wherein the disturbed air-water interface regions are contiguous and when viewed from above have an outline, the method further comprising the step of disposing a canopy on the cables to shadow the surface of the water outside of and adjacent to the outline of the contiguous disturbed air-water interface regions.

37. The method of claim 34 wherein the disturbed air-water interface regions are contiguous and when viewed from above have an outline, the method further comprising the step of disposing rafts on the water adjacent to the outline of the contiguous disturbed air-water interface regions to shadow the water beneath the rafts.

38. The method of claim 34 wherein the shower assemblies are supported above the surface of the water of the basin by buoys anchored within the basin.

39. The method of claim 34 wherein the shower assemblies are supported above the surface of the water of the basin by rafts moored within the basin.

40. The method of claim 39 wherein rafts have blackened-undersides, the method further comprising the step of disposing secondary lamp sub-assemblies beneath the surface of the water that are adapted for artificially illuminating the blackened-undersides of rafts.

41. The method of claim 34 wherein the fluid supplied to the shower assemblies is water.

42. The method of claim 34 wherein the fluid supplied to the shower assemblies is air.

43. The method of claim 34 wherein the disturbed air-water interface regions are contiguous.

44. The method of claim 43 wherein the contiguous disturbed air-water interface regions when viewed from above have an outline, the method further comprising the step of shading the surface of water outside of and adjacent to the outline of the contiguous disturbed air-water interface regions.

45. The method of claim 43 wherein an outline of the contiguous disturbed air-water interface regions when viewed from above has an apex that is located near the bypass facility.

46. The method of claim 34 wherein the plurality of lamp assemblies equals in number the plurality of shower assemblies.

47. The method of claim 46 wherein each of the lamp assemblies is located near one of the shower assemblies.

48. The method of claim 34 wherein the lamp assemblies are located near shower assemblies.

49. A method for guiding fish comprising the steps of:
- disposing above a surface of a body of water a plurality of shower assemblies that are spaced apart at locations along a path to be traversed by fish;
- supplying to the shower assemblies a fluid which the shower assemblies direct toward the surface of the body of water to create thereat disturbed air-water interface regions; and
- disposing a plurality of lamp assemblies adapted for artificially illuminating the disturbed air-water interface regions.

50. The method of claim 49 wherein the shower assemblies are supported above the body of water by cables stretched over the body of water.

51. The method of claim 50 wherein the disturbed air-water interface regions are contiguous and when viewed from above have an outline, the method further comprising the step of disposing a canopy on the cables to shadow the surface of the water outside of and adjacent to the outline of the contiguous disturbed air-water interface regions.

52. The method of claim 49 wherein the disturbed air-water interface regions are contiguous and when viewed from above have an outline, the method further comprising the step of disposing rafts on the water adjacent to the outline of the contiguous disturbed air-water interface regions to shadow the water beneath the rafts.

53. The method of claim 49 wherein the shower assemblies are supported above the body of water by buoys anchored within the body of water.

54. The method of claim 49 wherein the shower assemblies are supported above the body of water by rafts moored within the body of water.

55. The method of claim 54 wherein the rafts have blackened-undersides, the method further comprising the step of disposing secondary lamp sub-assemblies beneath the surface of the water that are adapted for artificially illuminating the blackened-undersides of rafts.

56. The method of claim 49 wherein the fluid supplied to the shower assemblies is water.

57. The method of claim 49 wherein the fluid supplied to the shower assemblies is air.

58. The method of claim 49 wherein the disturbed air-water interface regions are contiguous.

59. The method of claim 58 wherein the contiguous disturbed air-water interface regions when viewed from above have an outline, the method further comprising the step of shading the body of water outside of and adjacent to the outline of the contiguous disturbed air-water interface regions.

60. The method of claim 49 wherein the plurality of lamp assemblies equals in number the plurality of shower assemblies.

61. The method of claim 60 wherein each of the lamp assemblies is located near one of the shower assemblies.

62. The method of claim 49 wherein the lamp assemblies are located near shower assemblies.

63. A method for guiding fish comprising the steps of:
- disposing along a bank adjacent to a body of water a plurality of nozzles that are spaced apart along the bank and are oriented to direct a spray of water onto the body of water along a path to be traversed by fish;
- supplying to the nozzles a flow of water which the nozzles direct onto the body of water to create thereat disturbed air-water interface regions in which water moves in a direction to be traversed by fish; and
- disposing a plurality of lamp assemblies adapted for artificially illuminating the disturbed air-water interface regions.

* * * * *